Patented June 30, 1942

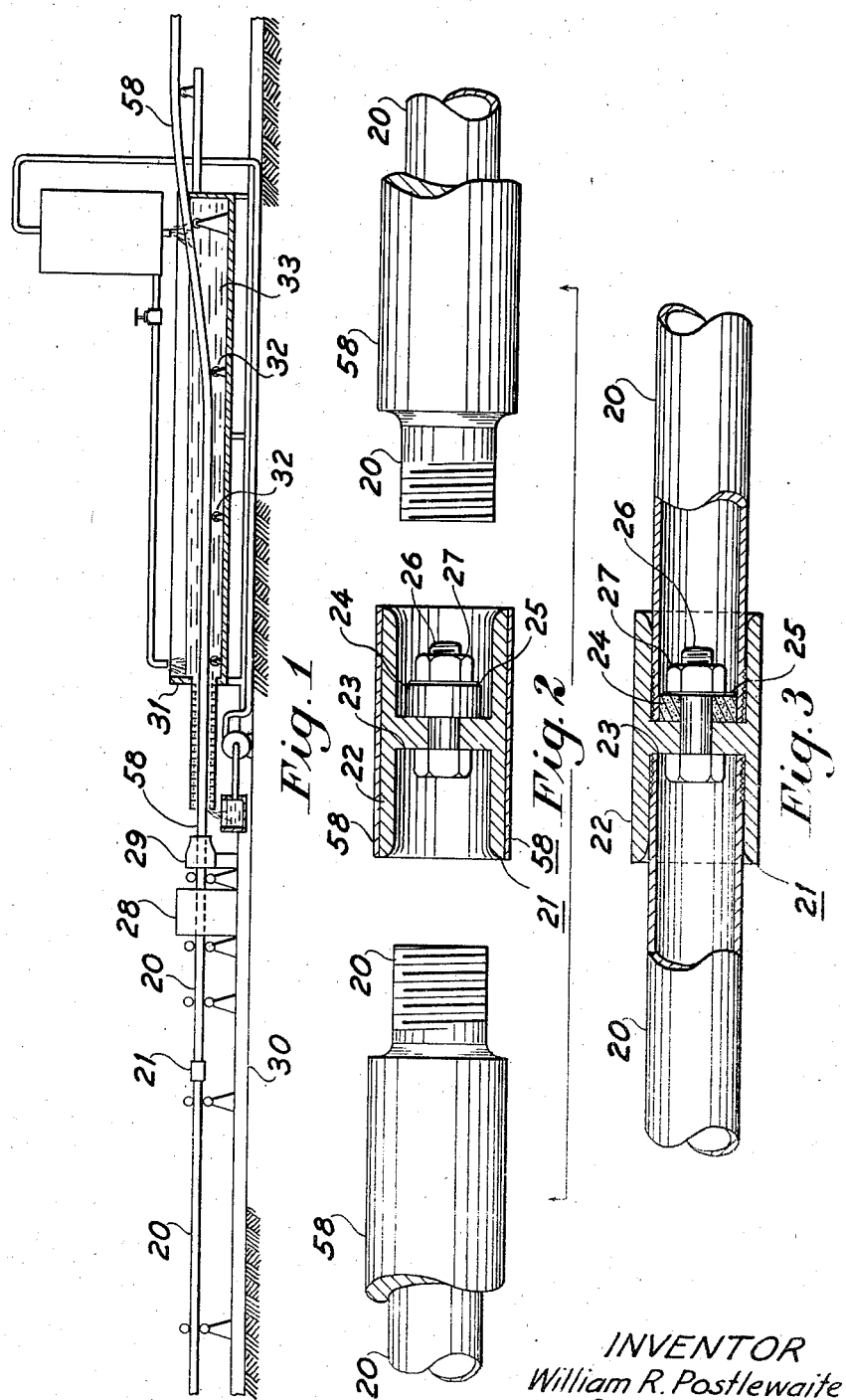

2,287,827

UNITED STATES PATENT OFFICE 2,287,827

PIPE COATING COUPLER

William R. Postlewaite, San Francisco, Calif., assignor to Standard Oil Company of California, San Francisco, Calif., a corporation of Delaware Original application July 30, 1938, Serial No. 222,207. Divided and this application April 26, 1940, Serial No. 331,849

3 Claims. (Cl. 285—1)

This invention relates to a coupler which is to be used in a continuous pipe coating operation and particularly one in which successive pipes are temporarily coupled together and coated with a thick layer of corrosion-resistant material. This application is a division of my copending application Serial No. 222,207, filed July 30, 1938, entitled Apparatus for coating pipe.

Heretofore couplings for connecting together pipe lengths which are to be successively passed into and through a coating apparatus adapted to place a relatively thick layer of plastic material on the outer surface of the pipe have been of the type shown in my Patent No. 2,077,769. These couplers were required to transmit torque and to pull a following length of pipe after a leading length. They were disposed either entirely within the pipe or had an outer surface which was flush with the outer diameter of the pipe. This invention is particularly adapted to the rapid coupling and subsequent separation of successive lengths of small diameter pipe, for example, from 1 inch to 4 inches, which are to be coated on their outer surface with a relatively thick initially plastic material, such as that of the C. S. McDonald et al. Patent No. 1,984,649. Small pipes of this type are generally provided with screw threads at each end and are joined by means of threaded couplings. This invention contemplates means for temporarily coupling together the successive lengths of pipe and also for protecting the threaded or otherwise prepared ends of the pipe so that a coating layer will not be deposited thereon. This saves considerable time in cleaning the ends and particularly the threads of the coated pipe.

It is an object of this invention to provide a coupling device for a continuous coating operation that will temporarily connect successive lengths of pipe in such a manner that they will be held in axial alignment and pass into and through the coating apparatus.

Another object is to provide a simple type of coupler that will serve to protect the ends of the pipe for a short distance along the length of the section so that coating will not be deposited on that portion of the pipe length.

Another object is to provide a coupling which, if desired, may be secured to one of the two successive lengths of pipe to be coupled for reasons well known in this art.

Another object is to provide a coupling which, although covering a portion of adjoining ends of successive pipes to be coated, will pass freely through the coating apparatus and receive such a thin layer of the coating material that it is readily cleaned and made ready for use on subsequent pipe lengths.

These and other objects and advantages will be further apparent from the following description and from the appended drawing which illustrates a preferred embodiment of the invention.

In the drawing,

Figure 1 is a longitudinal and part sectional view of a pipe coating operation to which this invention is applicable, as described and claimed in my co-pending application Serial No. 222,207.

Figure 2 is a longitudinal sectional view of one form of a coupling illustrating the method in which it protects the ends of adjoining sections of pipe from being covered with coating material.

Figure 3 is a longitudinal sectional view of a coupling in position to connect together two adjoining lengths of pipe which are to be coated.

Referring to the drawing, and particularly to Figure 1, reference numeral 20 designates the sections of pipe or other cylindrical objects to be coated successively entering the apparatus from the left end and being urged toward the right a short distant by hand or by any other suitable means. Pipe 20 is preferably prepared for coating by being cleaned, dried and coated with a suitable primer which may be a cut-back asphalt or a proper asphaltic composition that has been dried or hardened to form a thin layer that will soften to establish a bond between the pipe surface and the bituminous mastic to be applied in the extrusion nozzle which will be described below. Obviously other types of coating material may be found useful for this covering operation.

Succeeding lengths of pipe 20 are kept in alignment as they pass through the coating equipment by means such as the coupler generally designated 21 and shown in section in Figures 2 and 3. Coupler 21 may be secured to the leading section of pipe 20 and provides a cup or receptacle for freely receiving the advancing end of the following section of pipe for a purpose which will be apparent below. A preferred form of this coupler comprises a hollow cylindrical metal body 22 of an internal diameter which is substantially uniform throughout its length and is adapted to freely receive the ends of the pipe to be coated. A metal partition or abutment 23 separates the body into two chambers, in one of which is contained a cylindrical block 24 of resilient material, such as "Neoprene," held against partition 23, by a washer 25, bolt 26 and nut 27. The outer diameter of resilient block 24 is such that it will freely enter the inside of pipe 20 to be coated. When the head of bolt 26 is turned, block 24 is compressed longitudinally and spread radially to engage the inside of the leading section of pipe 20, thus holding coupler 21 in place thereon. The end of the succeeding section of pipe 20 may then be advanced into the chamber at the trailing end of coupler 21 and is readily removable therefrom after the coating has been applied.

The lengths or sections of pipe 20, aligned by couplers 21, are engaged by the drive means generally designated 28 and are forced axially toward the right into and through a coating means, such as the extrusion nozzle generally designated 29, in which a thick layer of hot bituminous mastic 58, for example, is applied. The thickness of the coating usually varies, depending upon the nature of the mastic, the diameter of the pipe and the severity of the corrosion-producing agents or conditions against which the pipe is to be protected, and may range from about ¼ inch for 1 inch pipe to about ½ inch for 4 inch pipe. Couplers 21 must obviously be of slightly less thickness than the final coating 58 in order to pass through coating means 29.

Referring to Figure 1 which illustrates one form of coating apparatus in which this invention may be used, it will be noted that drive means 28 and coating means 29 are preferably mounted on a suitable base 30 to preserve accurate alignment. Drive means 28 are more completely described in my co-pending application Serial No. 222,207. Generally they consist of two pairs of concave knurled rolls disposed above and below pipe 20, each pair supported to move upwardly and downwardly, respectively, when enlargements such as couplers 21 pass through the device. In that application this motion is permitted by securing the rolls on shafts which are journalled in swinging arms, these shafts being driven by gears which are rotated by any suitable source of power. Desirably the arms are connected by springs which urge the rolls into contact with the upper and lower surfaces of the pipe.

A coating means 29 generally consists of a suitable chamber surrounding the pipe and provided with means for forcing a plastic coating material onto the pipe so that it will be compressed thereon by passing outwardly through a concentric tapered nozzle. From coating means 29 the coated pipe passes into a cooling tank generally designated 31 and provided with resilient support rolls 32 which guide the pipe beneath the level of the cooling liquid 33 until the coating has hardened sufficiently to stand manual handling and stacking.

After the coated pipe has emerged from the tank, successive lengths may be separated by advancing the leading section whereupon the following section will pull out of coupler 21 so that the latter may be removed from the leading section. Because the following sections drive the leading sections through the coating machine and the cooling bath, it is not always necessary to secure the couplers to the leading sections as has been described above. To this end expanding washer 24, bolt 26 and nut 27 may be entirely omitted from the coupler so that it will consist simply of means forming axially aligned cylindrical bores to receive the end portions of successive pipe lengths, the outside diameter of the coupler being somewhat smaller or at least not greater than that of the coating layer, and desirably with abutment means separating the bores to define the distance to which the pipe ends may enter the bores so that no coating will be deposited on the protected portions.

Although a specific arrangement of this coupler and a particular mode of its use have been described and illustrated, it is obvious that many modifications and changes could be made without departing from the invention and all such changes that come within the scope of the appended claims are embraced thereby.

I claim:

1. A temporary coupler for use in a pipe coating apparatus of the type in which lengths of pipe are advanced successively into and through an extrusion chamber to form a thick layer of corrosion resistant material on said pipe lengths, said coupler comprising cylindrical means provided with opposed bores of substantially uniform diameter, each of said bores adapted to receive and protect an end of two successive lengths of pipe to be coated so that no coating will be deposited for a predetermined distance along said pipe length, and means in one of said bores operable from the opposite bore to engage one of said pipe lengths.

2. A temporary coupler for use in a continuous pipe coating operation of the type in which a thick layer of coating material is deposited on the outer surface of successive lengths of pipe to form a layer thereon, said coupler comprising means provided with axially aligned bores to receive the end portions of successive pipe lengths, the inside diameter of said bores being substantially uniform, the outside diameter of said means being equal to or less than that of said coating layer, abutment means separating said bores to define the distance to which said pipe ends may enter said bores, and means in one of said bores operable from the opposite side of said abutment to engage a pipe inserted into said bore.

3. A temporary coupler for use in a pipe coating apparatus of the type in which the pipe is advanced axially into and through an extrusion chamber to form a thick layer of hot thermoplastic material on said pipe, said coupler comprising hollow cylindrical means of substantially uniform diameter to receive and protect adjoining ends of two sections of pipe to be coated so that no coating will be deposited thereon, said cylindrical means being divided by a central partition, with a radially expansible member on one side of said partition and means extending through said partition effective to expand said member to engage a pipe end inserted into the coupler from the opposite end.

WILLIAM R. POSTLEWAITE.